United States Patent
Takayama et al.

(10) Patent No.: US 11,863,104 B2
(45) Date of Patent: Jan. 2, 2024

(54) MOTOR DRIVE DEVICE, ELECTRIC BLOWER, ELECTRIC VACUUM CLEANER, AND HAND DRYER

(71) Applicant: Mitsubishi Electric Corporation, Tokyo (JP)

(72) Inventors: Yuji Takayama, Tokyo (JP); Haruka Matsuo, Tokyo (JP); Kazunori Hatakeyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 795 days.

(21) Appl. No.: 16/962,989

(22) PCT Filed: Mar. 23, 2018

(86) PCT No.: PCT/JP2018/011935
§ 371 (c)(1),
(2) Date: Jul. 17, 2020

(87) PCT Pub. No.: WO2019/180970
PCT Pub. Date: Sep. 26, 2019

(65) Prior Publication Data
US 2020/0358378 A1 Nov. 12, 2020

(51) Int. Cl.
*H02P 3/12* (2006.01)
*H02P 3/22* (2006.01)
(Continued)

(52) U.S. Cl.
CPC ............... *H02P 3/22* (2013.01); *A47K 10/48* (2013.01); *A47L 9/2831* (2013.01); *A47L 9/2842* (2013.01)

(58) Field of Classification Search
CPC .... H02P 3/22; H02P 27/06; H02P 6/24; H02P 6/04; H02P 6/06; A47K 10/48; A47K 9/2831; A47K 9/2842
See application file for complete search history.

(56) References Cited

U.S. PATENT DOCUMENTS 9,998,038 B1 * 6/2018 Zhang ...................... H02P 3/22
9,998,061 B2 6/2018 Shinohara
2017/0237381 A1 8/2017 Shinohara

FOREIGN PATENT DOCUMENTS

JP S54-164291 A 12/1979
JP H09-252593 A 9/1997
(Continued)

OTHER PUBLICATIONS

Office Action dated Mar. 8, 2022, issued in corresponding JP Patent Application No. 2020-507290 (and English machine translation).
(Continued)

*Primary Examiner* — Karen Masih
(74) *Attorney, Agent, or Firm* — POSZ LAW GROUP, PLC

(57) ABSTRACT

A motor drive device includes a single-phase inverter converting a direct-current voltage output from a power supply that is a direct-current power supply into an alternating-current voltage having a high level, low level, or zero level potential. The inverter outputs the alternating-current voltage as a motor applied voltage to be applied to a motor. The alternating-current voltage is a voltage that has a high level, low level, or zero level potential. When a rotation speed of the motor is to be reduced, a section in which a potential of the motor applied voltage is zero level is widened.

10 Claims, 13 Drawing Sheets

(51) Int. Cl.
*A47K 10/48* (2006.01)
*A47L 9/28* (2006.01)

(56) References Cited

FOREIGN PATENT DOCUMENTS

| JP | H10-098894 A | 4/1998 |
|----|---|---|
| JP | 2007-060746 A | 3/2007 |
| JP | 2008278698 A | 11/2008 |
| JP | 2008-312338 A | 12/2008 |
| JP | 2009303469 A | 12/2009 |
| JP | 4710469 B2 | 6/2011 |
| JP | 2013-099210 A | 5/2013 |
| JP | 2014-023418 A | 2/2014 |
| JP | 2017-112688 A | 6/2017 |
| JP | 6169203 B1 | 7/2017 |
| WO | 2018/047274 A1 | 3/2008 |
| WO | 2017/077599 A1 | 5/2017 |

OTHER PUBLICATIONS

Office Action dated Sep. 8, 2021, issued in corresponding JP Patent Application No. 2020-507290 (and English Machine Translation).
Japanese Office Action dated Mar. 30, 2021, issued in corresponding JP Patent Application No. 2020-507290 (and English Machine Translation).
Office Action dated Aug. 30, 2022, issued in corresponding JP Patent Application No. 2020-507290 (and English machine translation).
International Search Report of the International Searching Authority dated Jun. 19, 2018 for the corresponding international application No. PCT/JP2018/011935 (and English translation).
Office Action dated Sep. 9, 2023 issued in corresponding CN patent application No. 201880090843.1 (and English translation).

* cited by examiner

MOTOR DRIVE DEVICE, ELECTRIC BLOWER, ELECTRIC VACUUM CLEANER, AND HAND DRYER

CROSS REFERENCE TO RELATED APPLICATION

This application is a U.S. national stage application of International Patent Application No. PCT/JP2018/011935 filed on Mar. 23, 2018, the disclosure of which is incorporated herein by reference.

TECHNICAL FIELD

The present invention relates to a motor drive device that drives a motor, and an electric blower, an electric vacuum cleaner, and a hand dryer that include the motor drive device.

BACKGROUND

Dynamic brake control for braking a motor is used to control a permanent magnet type synchronous three-phase motor. For the dynamic brake control, the coils of three phases provided in the motor are short-circuited to allow an induced voltage to carry a braking current through the three-phase coils for braking the motor. The induced voltage is an electromotive force generated by the rotation of a rotor of the motor. A problem with the dynamic brake control is that a large braking current transiently flows through the three-phase coils at the start of short-circuiting of the coils. Patent Literature 1 discloses a technique for solving that problem. For the technique disclosed in Patent Literature 1, a current sensor detects a current flowing through each of coils of three phases. When a value of the detected current flowing through a coil of any one of the three phases exceeds a specified value, three switching elements are turned off during a first time. After a lapse of the first time, the three switching elements are turned on.

PATENT LITERATURE

Patent Literature 1: Japanese Patent Application Laid-open No. 2013-99210

In order that the brake control disclosed in Patent Literature 1 is implemented in a current sensorless type drive device for driving a motor without using a current sensor, a plurality of current sensors is required for the brake control as the technique disclosed in Patent Literature 1 requires a current sensor therefore. The use of the plurality of current sensors poses a problem of upsizing of the driving device as well as complicating the structure of the driving device.

SUMMARY

The present invention has been made in view of the above, and an object thereof is to obtain a motor drive device capable of implementing brake control of a motor without using a current sensor.

To solve the above problems and achieve the object, a motor drive device according to the present invention comprises an inverter including a first arm and a second arm, the first arm being defined by a first upper-arm switching element and a first lower-arm switching element connected in series with the first upper-arm switching element, the second arm being defined by a second upper-arm switching element and a second lower-arm switching element connected in series with the second upper-arm switching element, the second arm being connected in parallel with the first arm, the inverter converting a direct-current voltage output from a direct-current power supply into an alternating-current voltage, and outputting the alternating-current voltage as a motor applied voltage to be applied to a motor. The alternating-current voltage has a high level, low level, or zero level potential, and when a rotation speed of the motor is to be reduced, a section in which a potential of the motor applied voltage is zero level is widened.

The motor drive device according to the present invention achieves an effect that brake control of a motor can be implemented without using a current sensor.

DETAILED DESCRIPTION

Hereinafter, a motor drive device, an electric blower, an electric vacuum cleaner, and a hand dryer according to an embodiment of the present invention will be described in detail with reference to the drawings. The present invention is not limited to the embodiment.

Embodiment

Figure 1:
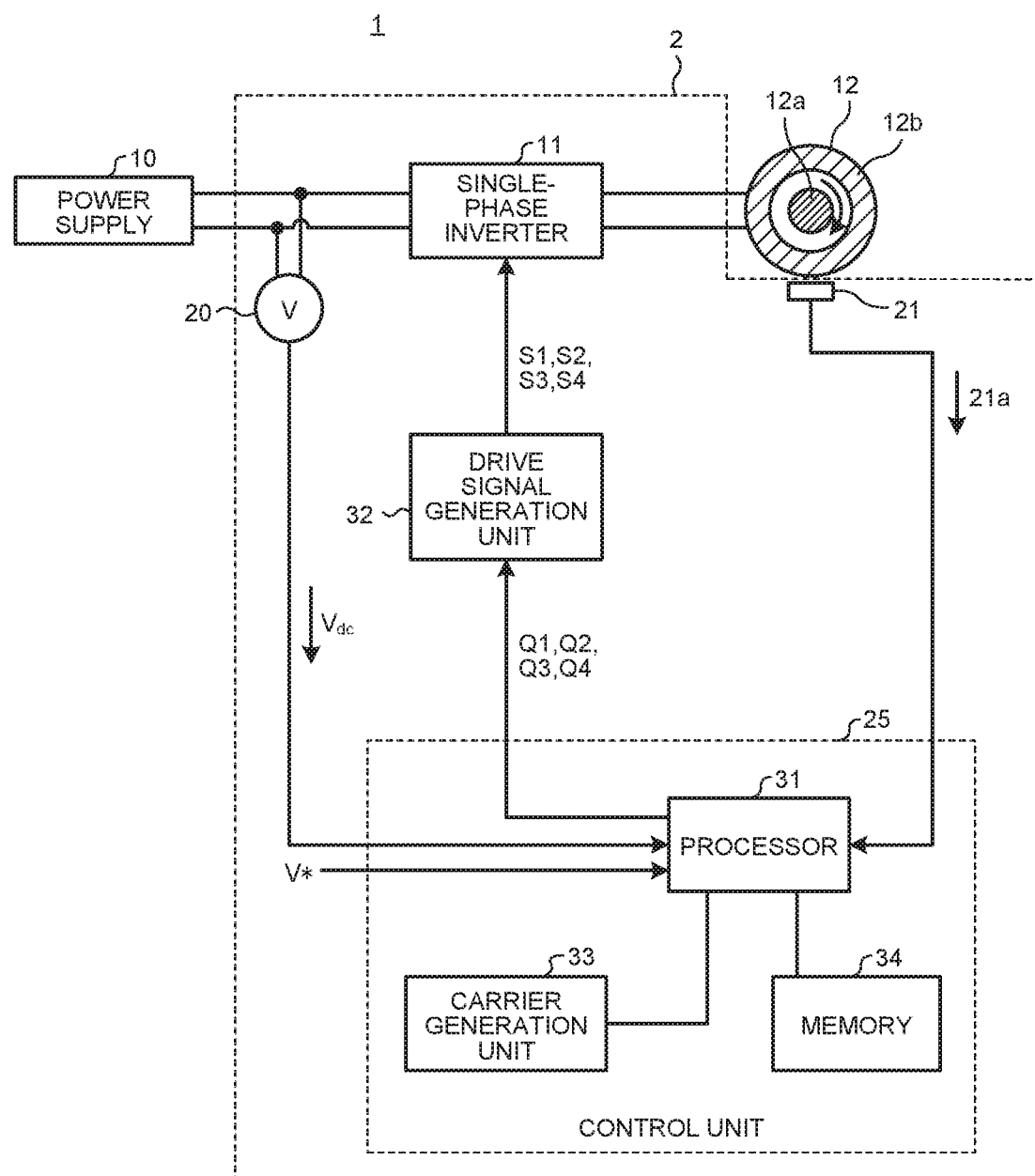
FIG. 1 is a diagram illustrating a configuration of a motor drive system including a motor drive device according to an embodiment of the present invention.

FIG. 1 is a diagram illustrating a configuration of a motor drive system including a motor drive device according to an embodiment of the present invention. A motor drive system 1 according to the embodiment of the present invention includes a power supply 10, a motor drive device 2, and a single-phase motor 12.

The power supply 10 is a direct-current power supply that supplies direct-current power to the motor drive device 2. The power supply 10 is a converter, a battery, or the like. The power supply 10 may be any power supply that outputs direct-current power, and is not limited to the converter, the battery, or the like.

The single-phase motor 12 is a brushless motor including a rotor 12a of a permanent magnet type and a stator 12b. The single-phase motor 12 may be any permanent magnet type motor that generates an induced voltage, and is not limited to the brushless motor. Four permanent magnets are arranged on the rotor 12a in a circumferential direction. These permanent magnets are arranged such that directions of magnetic poles thereof are alternately inverted in the circumferential direction, and form a plurality of magnetic poles of the rotor 12a. The number of permanent magnets is not limited to four, and is only required to be four or more. A winding (not illustrated) is wound around the stator 12b. A motor current flows through the winding. The motor current is equal to an alternating current supplied from a single-phase inverter 11 to the single-phase motor 12.

The motor drive device 2 is a device that supplies alternating-current power to the single-phase motor 12 to drive the single-phase motor 12. The motor drive device 2 includes a voltage sensor 20, a position sensor 21, the single-phase inverter 11, a control unit 25, and a drive signal generation unit 32.

The voltage sensor 20 detects a direct-current voltage $V_{dc}$ output from the power supply 10. The voltage sensor 20 may detect a voltage applied to an input end of the motor drive device 2, or may detect a direct-current voltage applied to a wiring connected to an output end of the power supply 10.

The position sensor 21 detects a rotor rotational position, which is a rotational position of the rotor 12a, and outputs information on the detected rotational position as a position sensor signal 21a. The position sensor signal 21a is a signal that has a potential of one of two values, i.e., a high level or a low level depending on a direction of a magnetic flux generated from the rotor 12a.

The single-phase inverter 11 is a power converter having a direct-current/alternating-current conversion function of converting a direct-current voltage output from the power supply 10, into an alternating-current voltage and applying the alternating-current voltage to a motor.

The control unit 25 generates PWM signals Q1, Q2, Q3, and Q4 on the basis of the direct-current voltage $V_{dc}$ and the position sensor signal 21a output from the position sensor 21. Hereinafter, the PWM signals Q1, Q2, Q3, and Q4 may be simply referred to as PWM signals.

The drive signal generation unit 32 amplifies the PWM signals output from the control unit 25 and outputs the amplified signals as drive signals S1, S2, S3, and S4 for driving switching elements in the single-phase inverter 11. The drive signals S1, S2, S3, and S4 are signals obtained by amplifying the PWM signals Q1, Q2, Q3, and Q4, respectively.

The control unit 25 includes a processor 31, a carrier generation unit 33, and a memory 34. The processor 31 is a processing unit that performs various calculations regarding PWM control and advance angle control. Details of the PWM control and the advance angle control will be described later. As the processor 31, a central processing unit (CPU, also referred to as a central processing device, a processing device, an arithmetic device, a microprocessor, a microcomputer, a processor, or a digital signal processor (DSP)), or system large scale integration (LSI) can be exemplified.

As the memory 34, a nonvolatile or volatile semiconductor memory such as a random access memory (RAM), a read only memory (ROM), a flash memory, an erasable programmable read only memory (EPROM), or an electrically erasable programmable read-only memory (EEPROM (registered trademark)) can be exemplified. The memory 34 is not limited thereto, and may be a magnetic disk, an optical disk, a compact disc, a mini disk, or a digital versatile disc (DVD). The memory 34 stores a program read by the processor 31. The memory 34 is used as a work area when the processor 31 performs an arithmetic process. A function of the carrier generation unit 33 illustrated in FIG. 1 may be implemented by a processor that executes a dedicated program stored in the memory 34, or may be implemented by dedicated hardware. Details of a configuration of the carrier generation unit 33 will be described later.

Figure 2:
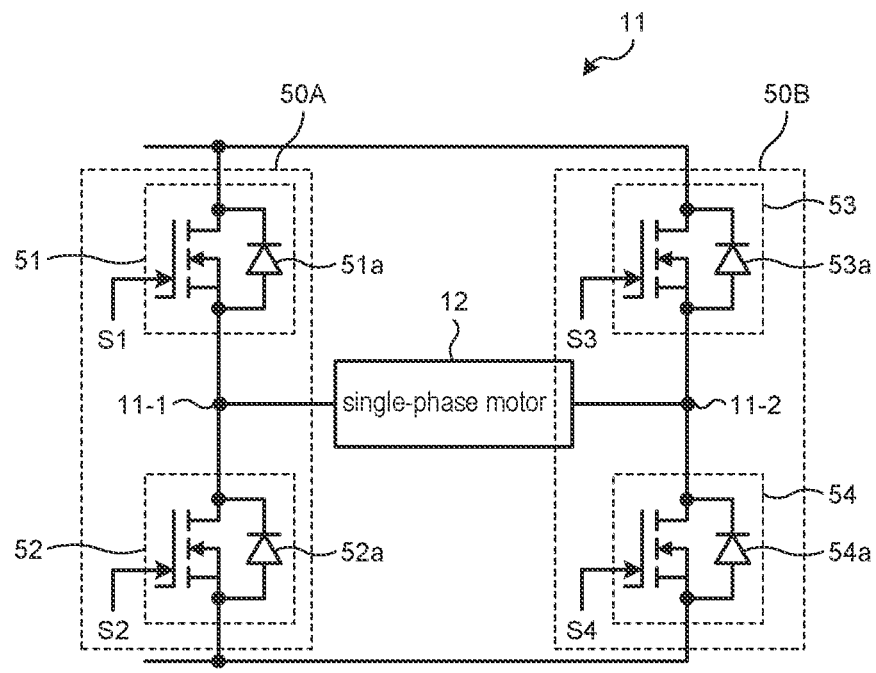
FIG. 2 is a diagram illustrating a circuit configuration of a single-phase inverter illustrated in FIG. 1.

FIG. 2 is a diagram illustrating a circuit configuration of the single-phase inverter illustrated in FIG. 1. The single-phase inverter 11 includes a plurality of switching elements 51, 52, 53, and 54 bridge-connected to one another. In addition to the plurality of switching elements 51, 52, 53, and 54 of the single-phase inverter 11, FIG. 2 illustrates the single-phase motor 12 connected to the single-phase inverter 11. Each of the two switching elements 51 and 53 located on a high-potential side is referred to as an upper-arm switching element. Each of the two switching elements 52 and 54 located on a low-potential side is referred to as a lower-arm switching element.

The switching element 51 is a first upper-arm switching element, and the switching element 52 is a first lower-arm switching element. The switching elements 51 and 52, which are connected in series with each other, define a first arm 50A. The switching element 53 is a second upper-arm switching element, and the switching element 54 is a second lower-arm switching element. The switching elements 53 and 54, which are connected in series with each other, define a second arm 50B. The second arm 50B is connected in parallel with the first arm 50A.

The switching element 51 has a connection end 11-1 connected to the switching element 52. The switching element 53 has a connection end 11-2 connected to the switching element 54. The connection ends 11-1 and 11-2 define alternating-current ends in a bridge circuit. The single-phase motor 12 is connected to the connection ends 11-1 and 11-2.

Each of the plurality of switching elements 51, 52, 53, and 54 is a MOSFET which is a metal-oxide-semiconductor field-effect transistor. The MOSFET is an example of a field-effect transistor (FET).

A body diode 51a connected in parallel between a drain and a source of the switching element 51 is formed in the switching element 51. A body diode 52a connected in parallel between a drain and a source of the switching element 52 is formed in the switching element 52. A body diode 53a connected in parallel between a drain and a source of the switching element 53 is formed in the switching element 53. A body diode 54a connected in parallel between a drain and a source of the switching element 54 is formed in the switching element 54. Each of the body diodes 51a, 52a, 53a, and 54a is a parasitic diode formed inside a MOSFET and is used as a freewheeling diode.

Each of the plurality of switching elements 51, 52, 53, and 54 is, for example, a MOSFET formed of a silicon-based material. However, each of the plurality of switching elements 51, 52, 53, and 54 is not limited to the MOSFET formed of a silicon-based material, and at least one of the plurality of switching elements 51, 52, 53, and 54 may be a MOSFET formed of a wide band gap semiconductor such as silicon carbide, a gallium nitride-based material, or diamond.

In general, wide band gap semiconductors have higher withstand voltage and heat resistance than silicon semiconductors. Thus, using a wide band gap semiconductor in at least one of the plurality of switching elements 51, 52, 53, and 54 increases the withstand voltage and the allowable current density of the switching elements 51, 52, 53, and 54, which makes it possible to reduce the size of a semiconductor module incorporating the switching elements 51, 52, 53, and 54 therein. Since wide band gap semiconductors also have high heat resistance, it is possible to reduce the size of a heat dissipation unit for dissipating heat generated in a semiconductor module, and also to simplify a heat dissipation structure for dissipating the heat generated in the semiconductor module.

Figure 3:
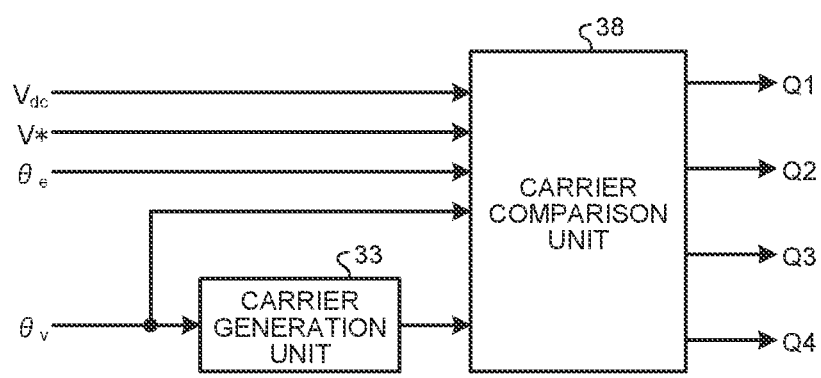
FIG. 3 is a diagram illustrating a functional configuration for generating pulse width modulation (PWM) signals illustrated in FIG. 1.
Figure 4:
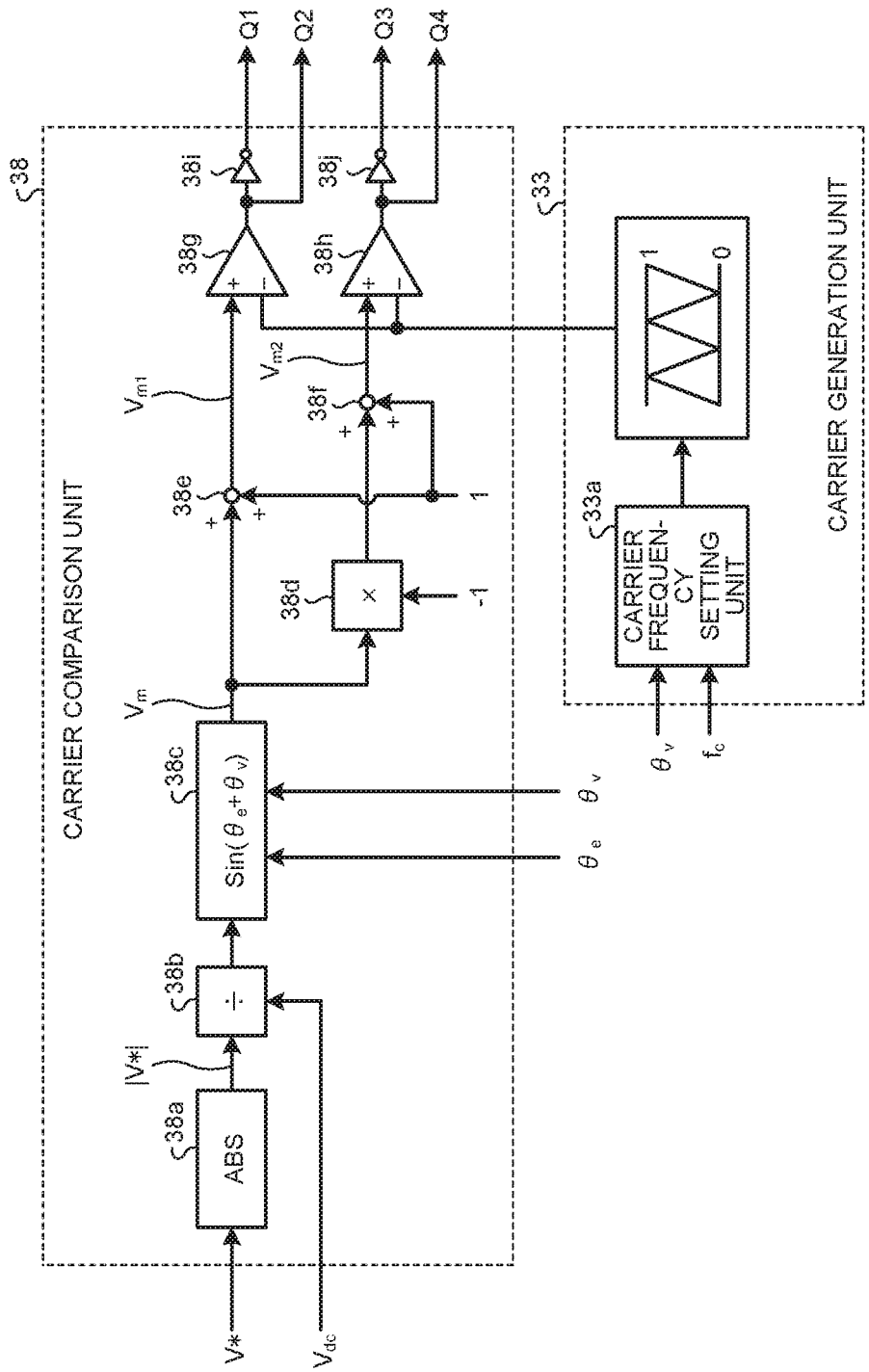
FIG. 4 is a diagram illustrating in detail a carrier comparison unit and a carrier generation unit illustrated in FIG. 3.

FIG. 3 is a diagram illustrating a functional configuration for generating the PWM signals illustrated in FIG. 1. FIG. 4 is a diagram illustrating in detail the carrier comparison unit and the carrier generation unit illustrated in FIG. 3. A function of generating the PWM signals Q1, Q2, Q3, and Q4 can be implemented by the carrier generation unit 33 and the carrier comparison unit 38 illustrated in FIG. 3. The function of the carrier comparison unit 38 is implemented by the processor 31 illustrated in FIG. 1. The carrier comparison unit 38 receives inputs of an advance phase $\theta_v$, a reference phase ee, a carrier generated by the carrier generation unit 33, the direct-current voltage $V_{dc}$, and a voltage amplitude command V* which is an amplitude value of a voltage command $V_m$. The carrier comparison unit 38 generates PWM signals on the basis of the advance phase $\theta_v$, the reference phase ee, the carrier, the direct-current voltage $V_{dc}$, and the voltage amplitude command V*.

The advance phase $\theta_v$ and the reference phase $\theta_e$ are used to generate voltage commands $V_{m1}$ and $V_{m2}$ illustrated in FIG. 4. The advance phase $\theta_v$ is calculated by an advance phase calculation unit described later. The "advance phase" is a phase that represents an advance angle $\theta_{vv}$ which is an advanced angle of a voltage command. The "advanced angle" is a phase difference between a motor applied voltage and a motor induced voltage. The motor applied voltage is a voltage applied to a stator winding (not illustrated) by the single-phase inverter 11. The motor induced voltage is a voltage induced in the stator winding. The motor applied voltage is synonymous with an inverter output voltage which is an output voltage of the single-phase inverter 11. When the motor applied voltage advances relative to the motor induced voltage, the "advanced angle" takes a positive value. The reference phase $\theta_e$ is calculated by a rotation speed calculation unit described later. The reference phase $\therefore_e$ is a phase obtained by converting a rotor mechanical angle, which is an angle of the rotor 12a from a reference position, into an electrical angle.

As illustrated in FIG. 4, the carrier generation unit 33 includes a carrier frequency setting unit 33a. A carrier frequency $f_c$ [Hz], which is a frequency of a carrier, is set in the carrier frequency setting unit 33a. The carrier frequency setting unit 33a generates a carrier synchronized with a cycle of the advance phase $\theta_v$. The generated carrier is output to the carrier comparison unit 38. FIG. 4 illustrates a waveform of a triangular wave which is an example of the carrier. The triangular wave is a signal wave whose peak value is "1" and whose valley value is "0". The PWM control on the single-phase inverter 11 includes synchronous PWM control and asynchronous PWM control. In the case of the asynchronous PWM control, it is not necessary to synchronize the carrier with the advance phase $\theta_v$.

The carrier comparison unit 38 includes an absolute value calculation unit 38a, a division unit 38b, a multiplication unit 38c, a multiplication unit 38d, an addition unit 38e, an addition unit 38f, a comparison unit 38g, a comparison unit 38h, an output inversion unit 38i, and an output inversion unit 38j.

The absolute value calculation unit 38a calculates an absolute value |V*| of the voltage amplitude command V*. The division unit 38b divides the absolute value |V*| by the direct-current voltage $V_{dc}$. The power supply 10 is, for example, a battery in which case even when a battery voltage decreases, the division of the absolute value |V*| by the direct-current voltage $V_{dc}$ can increase a modulation rate in such a manner as to prevent the motor applied voltage from decreasing due to that battery voltage decrease, as compared with a case where the battery voltage decreases and the division by the direct-current voltage $V_{dc}$ is not performed. The battery voltage means an output voltage of the battery.

When the power supply 10 is not a battery but a power conversion device that converts alternating-current power from a commercial power supply into direct-current power, a change in an output voltage of the power conversion device is smaller than a change in an output voltage of the battery because a change in a voltage of the commercial power supply is small. Thus, where the power supply 10 that outputs direct-current power, using a commercial power supply is connected to the single-phase inverter 11, a voltage generated inside the motor drive device 2, that is, a direct-current voltage whose voltage indicates a constant value may be input to the division unit 38b instead of the direct-current voltage $V_{dc}$ being input to the division unit 38b.

The multiplication unit 38c adds the advance phase $\theta_v$ to the reference phase $\theta_e$, thereby calculating a sine which is a result of the addition. The multiplication unit 38c calculates the voltage command $V_m$ by multiplying the calculated sine by an output of the division unit 38b.

The addition unit 38e adds 1 to the voltage command $V_m$ which is an output of the multiplication unit 38c. An output of the addition unit 38e is input to the comparison unit 38g as the voltage command $V_{m1}$ for driving the two switching elements 51 and 52 illustrated in FIG. 2. The voltage command $V_{m1}$ and the carrier are input to the comparison unit 38g. The comparison unit 38g compares the voltage command $V_{m1}$ with the carrier, thereby providing the comparison result that is the PWM signal Q2.

The output inversion unit 38*i* inverts an output of the comparison unit 38*g*. An output of the output inversion unit 38*i* is the PWM signal Q1. The output inversion unit 38*i* prevents the switching elements 51 and 52 from being turned on at the same time.

The multiplication unit 38*d* multiplies, by −1, the voltage command $V_m$ which is the output of the multiplication unit 38*c*. The addition unit 38*f* adds 1 to an output of the multiplication unit 38*d*. An output of the addition unit 38*f* is input to the comparison unit 38*h* as the voltage command $V_{m2}$ for driving the two switching elements 53 and 54 illustrated in FIG. 2. The voltage command $V_{m2}$ and the carrier are input to the comparison unit 38*h*. The comparison unit 38*h* compares the voltage command $V_{m2}$ with the carrier, thereby providing the comparison result that is the PWM signal Q4.

The output inversion unit 38*j* inverts an output of the comparison unit 38*h*. An output of the output inversion unit 38*j* is the PWM signal Q3. The output inversion unit 38*j* prevents the switching elements 53 and 54 from being turned on at the same time.

Figure 5:
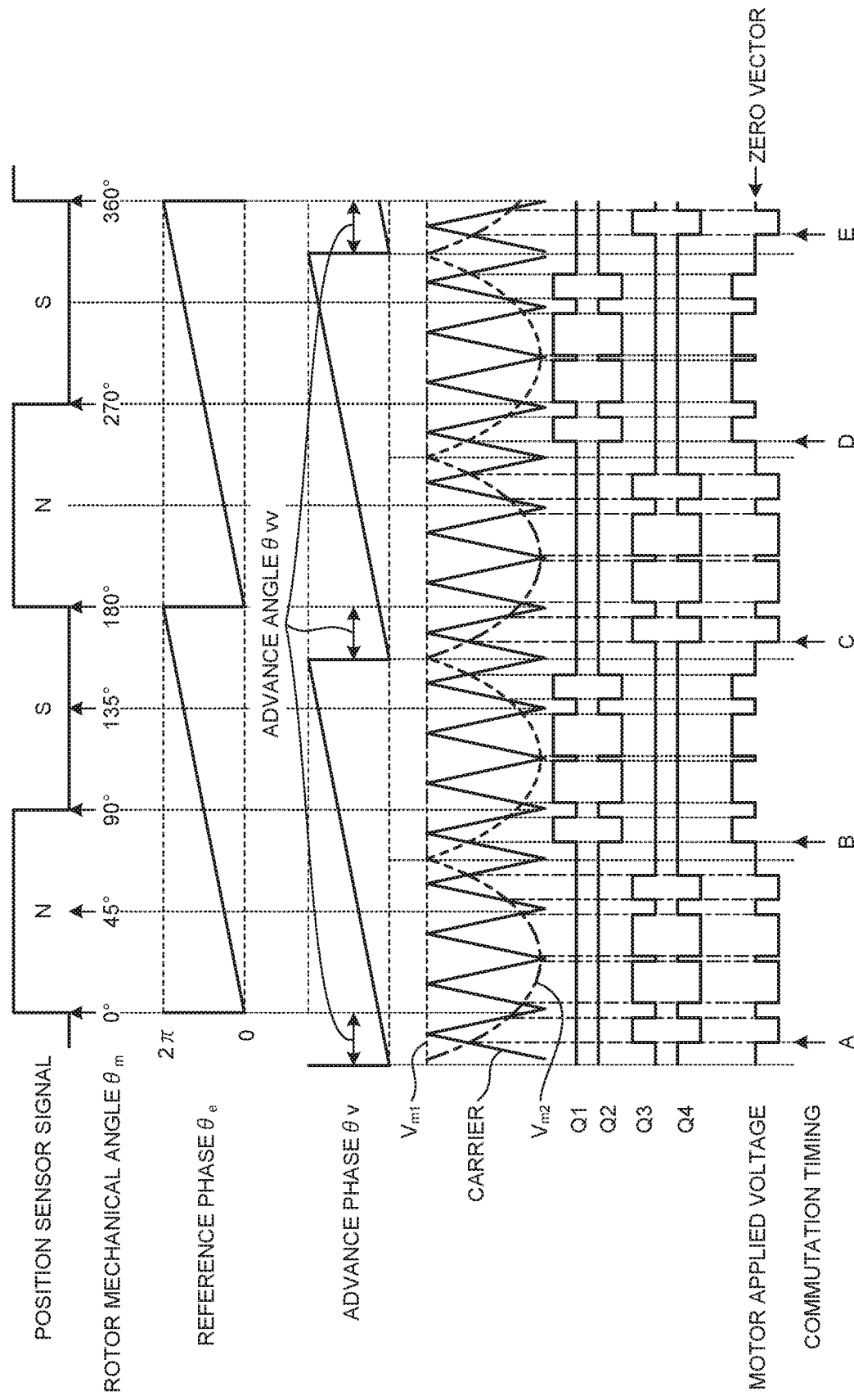
FIG. 5 is a time chart illustrating waveforms of voltage commands and the PWM signals illustrated in FIG. 4, and a motor applied voltage.

FIG. 5 is a time chart illustrating waveforms of the voltage commands and the PWM signals illustrated in FIG. 4, and the motor applied voltage. FIG. 5 illustrates waveforms of the position sensor signal, a rotor mechanical angle $\theta_m$, the reference phase ee, the advance phase $\theta_v$, the voltage commands $V_{m1}$ and $V_{m2}$, the carrier, the PWM signals Q1, Q2, Q3, and Q4, and the motor applied voltage. The waveform of the voltage command $V_{m1}$ is indicated by a broken line. The waveform of the voltage command $V_{m2}$ is indicated by a dot-and-dash line. These waveforms are waveforms detected when the rotor 12*a* including four permanent magnets makes one rotation, for example. A, B, C, D, and E indicated by arrows in FIG. 5 represent timing of commutation of a current flowing through each coil wound around the stator 12*b* of the single-phase motor 12.

The carrier comparison unit 38 illustrated in FIG. 4 can generate the PWM signals Q1, Q2, Q3 and Q4, using the voltage commands $V_{m1}$ and $V_{m2}$ having the waveforms illustrated in FIG. 5. As a result of using such PWM signals Q1, Q2, Q3, and Q4 to control the switching elements 51, 52, 53, and 54 in the single-phase inverter 11, a PWM-controlled motor applied voltage is applied to the single-phase motor 12. The motor applied voltage is a signal that takes a high level, low level, or zero level potential.

Known modulation methods used when generating the PWM signals Q1, Q2, Q3, and Q4 include a bipolar modulation method and a unipolar modulation method. The bipolar modulation method is a modulation method that outputs a voltage pulse that changes between positive and negative potentials. The unipolar modulation method is a modulation method that outputs a voltage pulse that changes among three potentials every half cycle of a power supply, that is, a voltage pulse that changes among a positive potential, a negative potential, and a zero potential.

The waveforms of the PWM signals Q1, Q2, Q3, and Q4 illustrated in FIG. 5 are obtained by the unipolar modulation. Any modulation method may be used for the motor drive device 2 according to the present embodiment. Where it is necessary to bring the waveform of the motor applied voltage and the waveform of a current flowing through each coil of the single-phase motor 12 closer to a sinusoidal wave, the unipolar modulation having a smaller harmonic content is more preferably employed than the bipolar modulation.

As described above, the motor applied voltage is determined by comparing the carrier with the voltage commands. As the number of motor rotations increases, the frequency of each voltage command increases, so that the number of voltage pulses included in the motor applied voltage output in one cycle of the electrical angle decreases. As a result, an influence of the number of voltage pulses on distortion of a current waveform increases. Generally, when the number of voltage pulses is an even number, even-order harmonics are superimposed on the motor applied voltage, and the symmetry between a positive-side waveform and a negative-side waveform disappears. Accordingly, in order to bring the waveform of the current flowing through each coil of the single-phase motor 12 closer to a sinusoidal wave in which the harmonic content is reduced, the number of voltage pulses in one cycle of the electrical angle is preferably controlled so as to be an odd number. Controlling the number of voltage pulses in one cycle of the electrical angle so as to be an odd number makes it possible to bring the waveform of the current flowing through each coil of the single-phase motor 12 closer to a sinusoidal wave.

Figure 6:
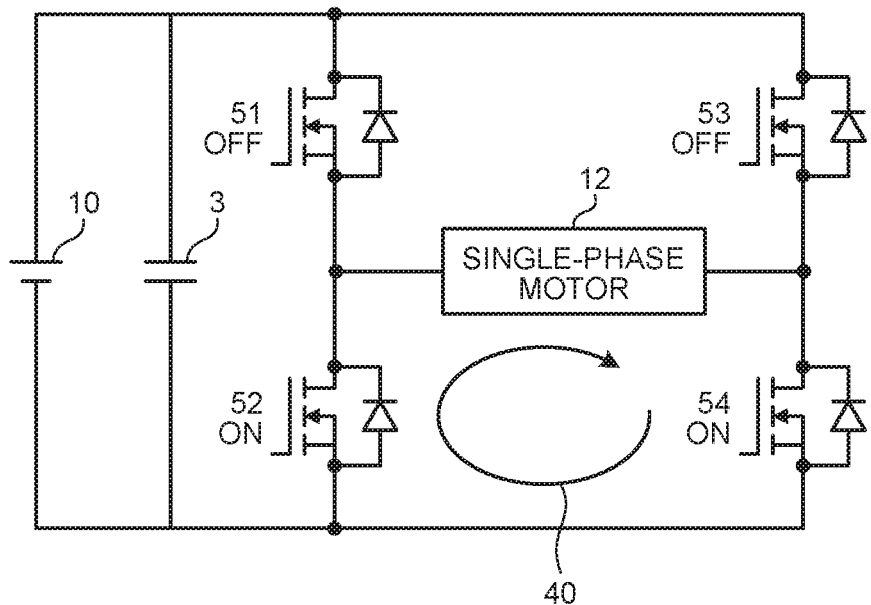
FIG. 6 is a diagram illustrating a path of a current flowing through the single-phase inverter when the motor applied voltage illustrated in FIG. 5 is 0 [V].

FIG. 6 is a diagram illustrating a path of a current flowing through the single-phase inverter when the motor applied voltage illustrated in FIG. 5 is 0 [V]. The motor applied voltage illustrated in FIG. 5 is 0 [V] during brake control. That is, the inverter output voltage during brake control is 0 [V]. When the inverter output voltage is 0 [V], the switching elements 51 and 53 are controlled such that the switching elements 51 and 53 are turned off, and the switching elements 52 and 54 are controlled such that the switching elements 52 and 54 are turned on. At that time, the single-phase inverter 11 is in a freewheeling mode. In the freewheeling mode, no current flows between the power supply and the single-phase inverter 11, but a current as indicated by a solid line 40 flows between the single-phase inverter 11 and the single-phase motor 12. This current is a braking current generated by the motor induced voltage. A direction in which the braking current flows is determined depending on a direction of a current flowing in the single-phase motor immediately before the freewheeling, that is, immediately before the brake control is started. The current, which has flowed out of the single-phase motor 12, returns to the single-phase motor 12 by passing through the switching element 54 and the switching element 52.

Figure 7:
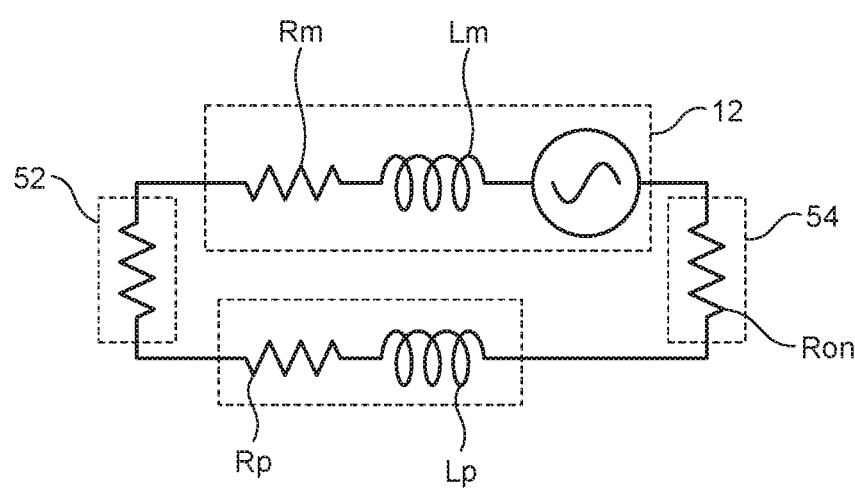
FIG. 7 is a diagram illustrating an equivalent circuit of a switching element 52, a switching element 54, and a single-phase motor illustrated in FIG. 6.

FIG. 7 is a diagram illustrating an equivalent circuit of the switching elements 52 and 54, and the single-phase motor illustrated in FIG. 6. In FIG. 7, Rm represents motor winding resistance of the single-phase motor 12, Lm represents motor winding inductance of the single-phase motor 12, and Ron represents ON-resistance of each of the switching elements 52 and 54. Rp represents the resistance of a wiring line that connects the single-phase motor 12, the switching element 52, and the switching element 54 to one another, and Lp represents the inductance of the wiring line.

Since the single-phase motor 12 is rotating at a rotation speed ω, an induced voltage Em is represented by the product of the rotation speed co and an induced voltage constant φ (Em=ωφ). A braking current I flowing when the induced voltage Em is generated can be expressed as I=ωφ/(Rm+2Ron+Rp+jω(Lm+Lp)).

Some conventional technique short-circuits coils to thereby decrease a braking current. Unfortunately, the mere short-circuiting of the coils increases di/dt, which is a change component of a motor current. To reduce the change component of the motor current, it is necessary to use a braking resistor or a highly accurate and highly responsive current sensor. The motor drive device 2 of the present embodiment, which need not use a braking resistor, a current sensor, or the like, can simplify the configuration of the motor drive system 1 and improve reliability.

Figure 8:
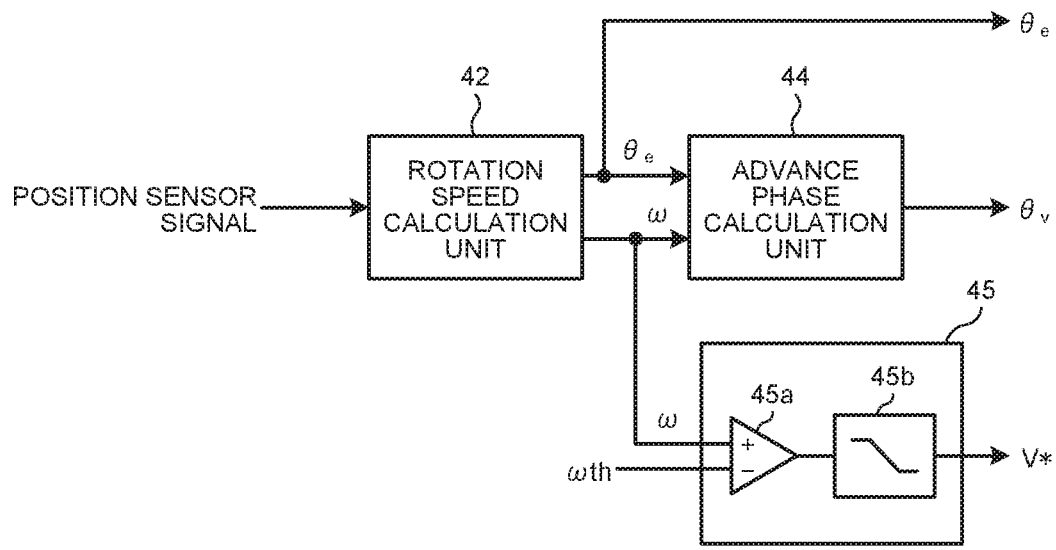
FIG. 8 is a diagram illustrating a functional configuration for calculating an advance phase input to the carrier generation unit and the carrier comparison unit illustrated in FIGS. 3 and 4.

Next, the advance angle control in the present embodiment will be described. FIG. 8 is a diagram illustrating a functional configuration for calculating an advance phase input to the carrier generation unit and the carrier comparison unit illustrated in FIGS. 3 and 4. A function of each of a rotation speed calculation unit 42, an advance phase calculation unit 44, and a voltage amplitude command control unit 45 illustrated in FIG. 8 is implemented by the processor 31 and the memory 34 illustrated in FIG. 1. That is, a computer program for executing processes of the rotation speed calculation unit 42, the advance phase calculation unit 44, and the voltage amplitude command control unit 45 is stored in the memory 34, and then the processor 31 reads and executes the program, and thereby the functions of the rotation speed calculation unit 42, the advance phase calculation unit 44, and the voltage amplitude command control unit 45 are realized. The voltage amplitude command control unit 45 includes a comparator 45a and a command adjustment unit 45b.

The rotation speed calculation unit 42 calculates the rotation speed co and the reference phase $\theta_e$ of the single-phase motor 12 on the basis of the position sensor signal 21a. The reference phase $\theta_e$ is a phase obtained by converting the rotor mechanical angle $\theta_m$, which is a rotation angle of the rotor 12a from the reference position, into an electrical angle. The advance phase calculation unit 44 calculates the advance phase $\theta_v$ on the basis of the rotation speed co and the reference phase $\theta_e$ calculated by the rotation speed calculation unit 42.

Figure 9:
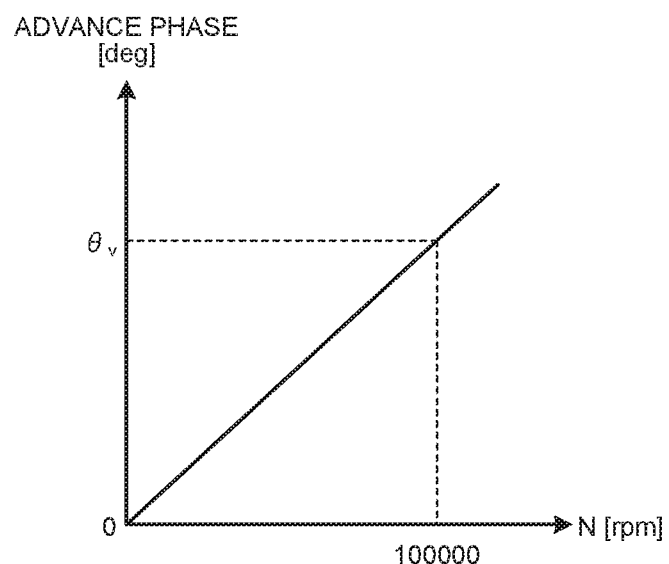
FIG. 9 is a diagram illustrating an example of a method of calculating the advance phase illustrated in FIG. 8.

FIG. 9 is a diagram illustrating an example of a method of calculating the advance phase illustrated in FIG. 8. The horizontal axis in FIG. 9 represents the number of motor rotations N, and the vertical axis in FIG. 9 represents the advance phase $\theta_v$. The number of motor rotations N is the number of rotations per unit time and corresponds to a rotation speed. As illustrated in FIG. 9, the advance phase $\theta_v$ can be determined using a function in which the advance phase $\theta_v$ increases as the number of motor rotations N increases. Although the example in FIG. 9 provides the advance phase $\theta_v$ determined by a first order linear function, the function determining the advance phase $\theta_v$ is not limited thereto. Any function other than the first order linear function may be used as long as the advance phase $\theta_v$ becomes the same or large in correspondence to the increase in the number of motor rotations N.

When the number of motor rotations N increases, the frequency of the position sensor signal 21a increases, so that the advance phase calculation unit 44 illustrated in FIG. 8 increases the advance phase $\theta_v$. In a case where a load connected to the single-phase motor is reduced when the advance phase $\theta_v$ is increased in the manner as described above, the number of motor rotations N continues to increase. In the case of an electric vacuum cleaner having the single-phase motor installed therein, for example, a suction tool of the electric vacuum cleaner fails to suck in air due to contact with the floor, which is a surface to be cleaned. For this reason, an inside of the electric vacuum cleaner is brought into a reduced pressure state or a vacuum state. As a result, the air resistance of a fan that is a load connected to the single-phase motor is considerably reduced in which case the number of motor rotations N continues to increase. When the number of motor rotations N increases in this manner, the magnets provided on the rotor surface may scatter due to a centrifugal force. In addition, the centrifugal force may deform or destroy the fan. For this reason, generally, an upper limit value is imposed on the number of motor rotations N, and the number of motor rotations N is controlled such that the number of motor rotations N does not exceed the upper limit value.

In the present embodiment, when the number of motor rotations N exceeds the upper limit value, a value of the voltage amplitude command V* is gradually decreased so that the amplitudes of the voltage commands $V_{m1}$ and $V_{m2}$ illustrated in FIG. 5 decrease to be smaller than the amplitudes of the voltage commands $V_{m1}$ and $V_{m2}$ before the number of motor rotations N exceeds the threshold. For example, the value of the voltage amplitude command V* is decreased by a fixed decrease amount per unit time. Due to the decrease in the voltage amplitude command V*, the width of a zero vector section of the motor applied voltage is gradually increased to be wider than the width of the zero vector section before the number of motor rotations N exceeds the upper limit value. The zero vector section is a section in which a potential of the motor applied voltage illustrated in FIG. 5 is zero level, that is, the motor applied voltage is 0 [V].

Figure 10:
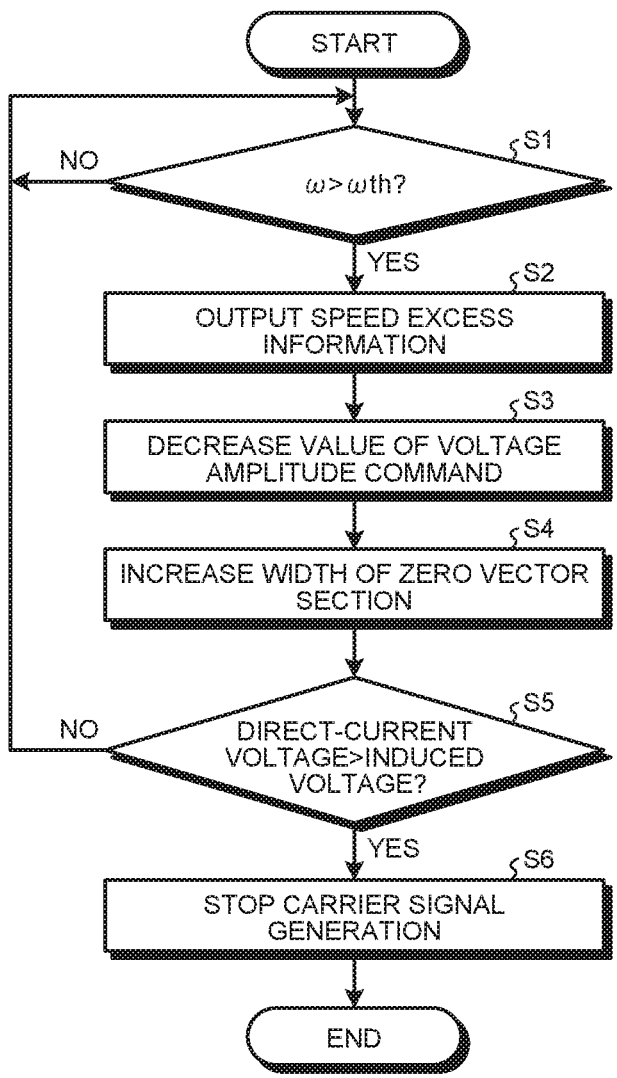
FIG. 10 is a flowchart explaining operations of a voltage amplitude command control unit illustrated in FIG. 8 and the carrier comparison unit illustrated in FIG. 4.

Next, a description will be described as to an operation of changing the width of the zero vector section of the motor applied voltage when the number of motor rotations exceeds the upper limit value. FIG. 10 is a flowchart explaining operations of the voltage amplitude command control unit illustrated in FIG. 8 and the carrier comparison unit illustrated in FIG. 4. The comparator 45a illustrated in FIG. 8 compares the rotation speed co calculated by the rotation speed calculation unit 42 with the rotation speed threshold ωth, thereby determining whether the rotation speed co has exceeded the rotation speed threshold ωth, that is, whether the number of motor rotations N has exceeded a specific threshold (step S1).

If the rotation speed ω has not exceeded the rotation speed threshold ωth (step S1, No), the process in step S1 is repeated until the rotation speed ω exceeds the rotation speed threshold ωth. At that time, the command adjustment unit 45b outputs a voltage amplitude command V* that makes the amplitudes of the voltage commands $V_{m1}$ and $V_{m2}$ constant.

If the rotation speed ω has exceeded the rotation speed threshold ωth (step S1, Yes), the comparator 45a outputs, to the command adjustment unit 45b, speed excess information indicating that the rotation speed ω has exceeded the rotation speed threshold ωth (step S2). When the speed excess information is input to the command adjustment unit 45b, the command adjustment unit 45b gradually decreases the value of the voltage amplitude command V* (step S3). The voltage commands $V_{m1}$ and $V_{m2}$ generated on the basis of the voltage amplitude command V* are compared with the carrier, thereby generating the PWM signals. The voltage commands $V_{m1}$ and $V_{m2}$ are updated at timing when the carrier rises up to the peak or falls down to the valley. The command adjustment unit 45b updates the voltage amplitude command V* at the timing when the carrier rises up to the peak or falls down to the valley. To update the voltage amplitude command V*, for example, the command adjustment unit 45b subtracts a constant value from the previous voltage amplitude command V* to thereby update the latest voltage amplitude command V*. This operation is repeated to thereby gradually decrease the value of the voltage amplitude command V*.

The decrease in the value of the voltage amplitude command V* results in a decrease in an amplitude value of the voltage command $V_m$ in the carrier comparison unit 38 illustrated in FIG. 4. The decrease in the amplitude value of the voltage command $V_m$ results in a decrease in an amplitude value of each of the voltage commands $V_{m1}$ and $V_{m2}$ that are to be compared with the carrier. Consequently, the width of an ON-interval of each PWM signal widens, so that the width of the zero vector section of the motor applied voltage illustrated in FIG. 5 is gradually increased to be wider than the width of the zero vector section before the rotation speed ω exceeds the rotation speed threshold ωth (step S4).

As described above, even when the number of motor rotations N rapidly increases due to the reduced load, the motor drive device 2 according to the present embodiment performs control for widening the width of the zero vector section of the motor applied voltage, thereby making it possible to brake the motor while reducing demagnetization.

After step S4, the processor 31 compares, for example, the direct-current voltage $V_{dc}$ with the induced voltage Em calculated by the product of the rotation speed ω and the induced voltage constant φ, and determines whether the induced voltage Em has decreased to be lower than the direct-current voltage $V_{dc}$ (step S5). That is, the processor 31 uses the direct-current voltage $V_{dc}$ to determine whether the induced voltage generated in the motor has decreased to be lower than the direct-current voltage.

If the induced voltage Em is higher than the direct-current voltage $V_{dc}$ (step S5, No), the processes from step S1 onward are repeated until the induced voltage Em decreases to be lower than the direct-current voltage $V_{dc}$.

If the induced voltage Em has decreased to be lower than the direct-current voltage $V_{dc}$ (step S5, Yes), the processor 31 stops the carrier signal generation performed by the carrier comparison unit 38 (step S6). Consequently, the operation of the single-phase inverter 11 stops, thereby preventing the increase in the regenerative voltage from the single-phase inverter 11, and thus preventing, for example, an increase in each of voltages applied to a smoothing capacitor 3 and the power supply 10 illustrated in FIG. 6. As a result, the life of the smoothing capacitor 3 and the power supply 10 can be extended.

Figure 11:
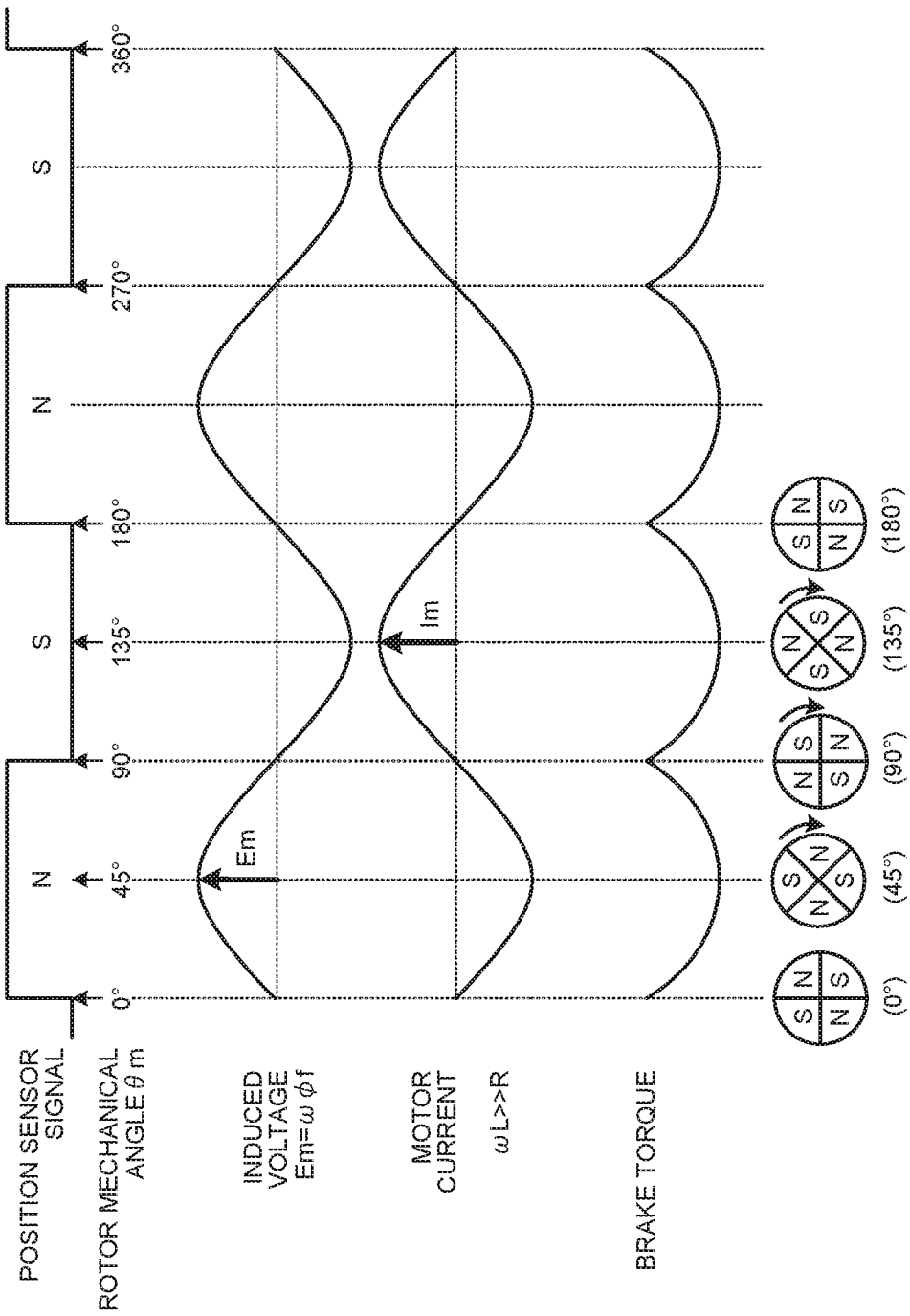
FIG. 11 is a diagram illustrating a relationship between a motor current flowing through a winding of a stator illustrated in FIG. 1 and a brake torque generated in a motor.

FIG. 11 is a diagram illustrating a relationship between the motor current flowing through the winding of the stator illustrated in FIG. 1 and a brake torque generated in the motor. FIG. 11 illustrates a waveform of the position sensor signal, the rotor mechanical angle $θ_m$, a waveform of the induced voltage, a waveform of the motor current, and a waveform of the brake torque. In addition, FIG. 11 illustrates, for example, 0°, 45°, 90°, 135°, and 180° as the rotor mechanical angle $θ_m$ when the rotor 12a rotates clockwise. When the rotor 12a rotates clockwise, the position sensor signal 21a corresponding to the rotor mechanical angle $θ_m$ is output. If the rotation speed ω is sufficiently high and ωL>>R holds, the motor current has a waveform having its phase lagging 90 degrees behind the induced voltage. Accordingly, the brake torque is determined by the product of the magnetic flux generated from the magnets provided on the rotor and the motor current, and changes as illustrated in FIG. 11. The average value of the brake torque is 0.

In a case where the PWM signals for turning off the switching elements 51 and 53, and turning on the switching elements 52 and 54, as illustrated in FIG. 6, are continues while the induced voltage is generated, the motor current rapidly increases and a large braking current transiently flows. As a result, the magnets on the rotor may be demagnetized.

In the present embodiment, when the PWM signals as illustrated in FIG. 5 are generated, the amplitudes of the voltage commands $V_{m1}$ and $V_{m2}$ are controlled such that the amplitudes of the voltage commands $V_{m1}$ and $V_{m2}$ are reduced to thereby gradually widen the width of the zero vector section. The gradual widening of the width of the zero vector section makes it possible to reduce an increase in the braking current when the number of motor rotations N rapidly increases. Since the increase in the braking current is reduced, the occurrence of demagnetization is reduced. In addition, since the width of the zero vector section is gradually widened, it is possible to decrease the braking current while decreasing the motor applied voltage. Therefore, stop time of the motor can be shortened as compared with a case where there is no zero vector section.

In addition, since the increase in the braking current is reduced, the increase in the current flowing through each of the plurality of switching elements 51, 52, 53, and 54 is also reduced. Therefore, it is possible to prevent each of the plurality of switching elements 51, 52, 53, and 54 from breaking down by exceeding its own withstand current (maximum current). Furthermore, since it is possible to prevent a switching element from exceeding a withstand current, a switching element having a small-capacity switching element providing a small allowable amount of current can be used, and an increase in manufacturing cost of the single-phase inverter 11 can be reduced.

Figure 12:
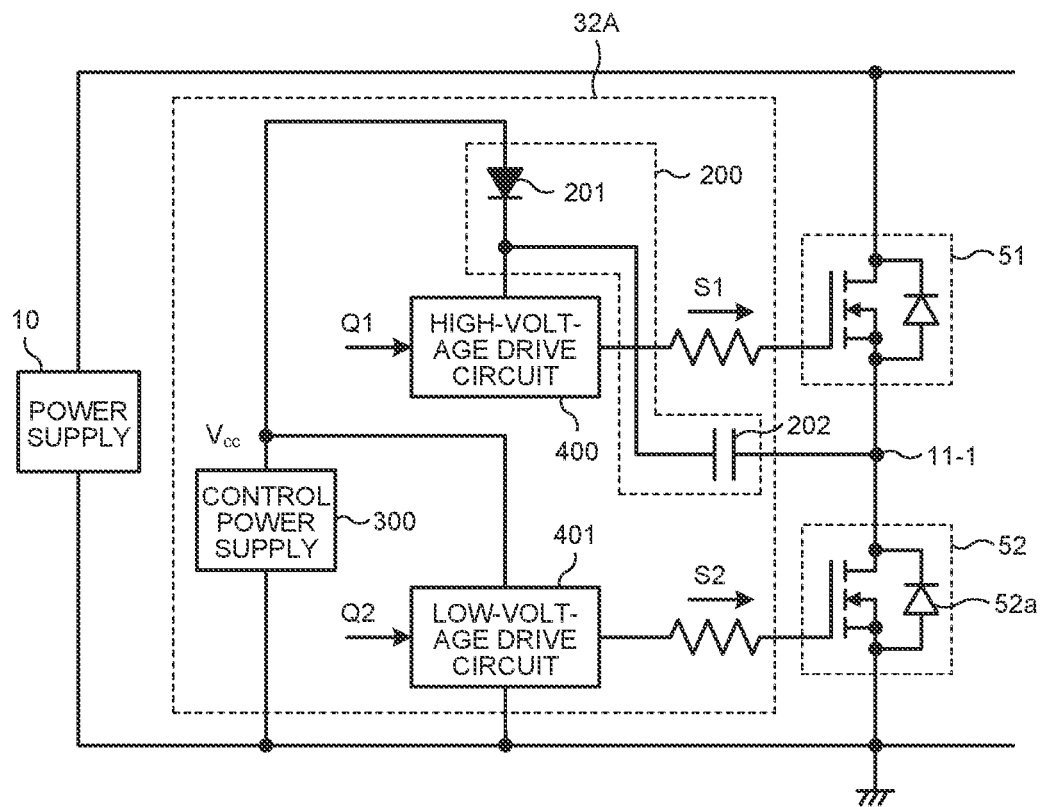
FIG. 12 is a diagram illustrating an example configuration of a signal generation circuit included in a drive signal generation unit illustrated in FIG. 1.

Next, a configuration of the drive signal generation unit 32 will be described. FIG. 12 is a diagram illustrating an example configuration of a signal generation circuit included in the drive signal generation unit illustrated in FIG. 1. A signal generation circuit 32A illustrated in FIG. 12 is a circuit that generates the drive signals S1 and S2. Note that FIG. 12 does not illustrate a circuit that generates the drive signals S3 and S4, but since the circuit is configured similarly to the signal generation circuit 32A illustrated in FIG. 12, a description of a configuration thereof will be omitted hereinafter.

The signal generation circuit 32A includes a control power supply 300 which is a direct-current voltage source, a bootstrap circuit 200, a high-voltage drive circuit 400, and a low-voltage drive circuit 401.

The bootstrap circuit 200 includes a boot diode 201 whose anode is connected to the control power supply 300, and a boot capacitor 202 whose one end is connected to a cathode of the boot diode 201. The other end of the boot capacitor 202 is connected to the connection end 11-1 of the switching element 51 to the switching element 52. The boot capacitor 202 functions to increase a voltage for operating the high-voltage drive circuit 400 higher than a voltage output from the control power supply 300.

For the bootstrap circuit 200 configured as described above, the boot capacitor 202 is charged through a current flowing through a path defined by the control power supply 300, the boot diode 201, the boot capacitor 202, and the switching element 52 when the switching element 52 is turned on. A capacitor voltage $V_c$ generated across the charged boot capacitor 202 can be expressed as $V_c=V_{cc}+V_{BD}-V_f$ where $V_{cc}$ represents a voltage of the control power supply 300, $V_{BD}$ represents a forward voltage of the body diode 52a, and $V_f$ represents a forward voltage of the boot diode 201.

The high-voltage drive circuit 400 uses, as a power supply voltage, a voltage output from the bootstrap circuit 200 to convert the PWM signal Q1 into the drive signal S1 and outputs the drive signal S1 to a gate of the switching element 51.

The low-voltage drive circuit 401 uses, as a power supply voltage, the voltage output from the control power supply 300 to convert the PWM signal Q2 into the drive signal S2 and outputs the drive signal S2 to a gate of the switching element 52.

Note that circuits similar to the high-voltage drive circuit 400 and the bootstrap circuit 200 illustrated in FIG. 12 are used to generate the drive signal S3 for the switching element 53 illustrated in FIG. 2. In addition, a circuit similar to the low-voltage drive circuit 401 illustrated in FIG. 12 is used to generate the drive signal S4 for the switching element 54 illustrated in FIG. 2.

For the motor drive device 2 according to the present embodiment, the upper-arm switching elements are turned off and the lower-arm switching elements are turned on, thereby allowing the motor applied voltage to include a zero vector section in which a current circulates among the lower-arm switching elements and the single-phase motor 12. Consequently, charge is stored in the boot capacitor 202, which is a drive power supply for the upper-arm switching element, and a voltage required for an operation of the upper-arm switching element can be stabilized.

A general electric blower is controlled such that the number of rotations is constant. For such a constant rotation number control, an overcurrent may flow through a motor. The reason why the overcurrent flows is that a current changes rapidly in an attempt to keep the number of motor rotations constant when a load changes. More specifically, when the control rotation number control is performed at a time of transition from a "light load state", i.e., a "small load torque state" to a "heavy load state", i.e., a "large load torque state", a motor output torque needs to be increased in an attempt to keep the number of rotations unchanged, which results in an increased amount of change in a motor current.

The present embodiment provides control performed so that the voltage amplitude command V* is constant during steady operation. Since the voltage amplitude command V* is constant, the voltage amplitude command V* is not changed when a load increases. As a result, the number of motor rotations decreases in correspondence to an increase in a load torque. This control prevents an abrupt change in the motor current and an overcurrent, thereby achieving an electric blower and an electric vacuum cleaner that rotate stably.

In a case of the electric blower, the load torque increases due to an increase in the number of rotations of blades that are a load of the motor, and also increases due to an increase in the diameter of an air passage. The diameter of the air passage indicates, for example, a size of a suction port of an electric vacuum cleaner.

For example, when the diameter of the air passage is large because nothing is in contact with the suction port, a force for sucking the wind is required.

Accordingly, the load torque increases under the condition where the blades rotate at the same number of rotations. On the other hand, when the suction port is closed by something in contact with the suction port, the diameter of the air passage is narrowed and the force for sucking the wind is not necessary. Therefore, the load torque decreases under the condition where the blades rotate at the same number of rotations.

Next, an effect of the advance angle control will be described. Increasing the advance phase $\theta_v$ in correspondence to an increase in the number of rotations can widen a range of the number of rotations. When the advance phase $\theta_v$ is set to "0", the number of rotations is saturated at a point where the motor applied voltage is equal to the motor induced voltage. In order to further increase the number of rotations, the advance phase $\theta_v$ is advanced to weaken a magnetic flux generated in the stator due to an armature reaction, thereby reducing an increase in the motor induced voltage and thus increasing the number of rotations. Accordingly, a wide region of the number of rotations can be obtained by selecting the advance phase $\theta_v$ in correspondence to the number of rotations.

In applying the advance angle control according to the present embodiment to the electric vacuum cleaner, a voltage command is kept constant regardless of a change in a closed state of the suction port, that is, regardless of the load torque, and the advance phase $\theta_v$ which is an advanced angle of the voltage command is increased in correspondence to an increase in the rotation speed. With such control, stable driving is possible in a wide rotation speed range.

Figure 13:
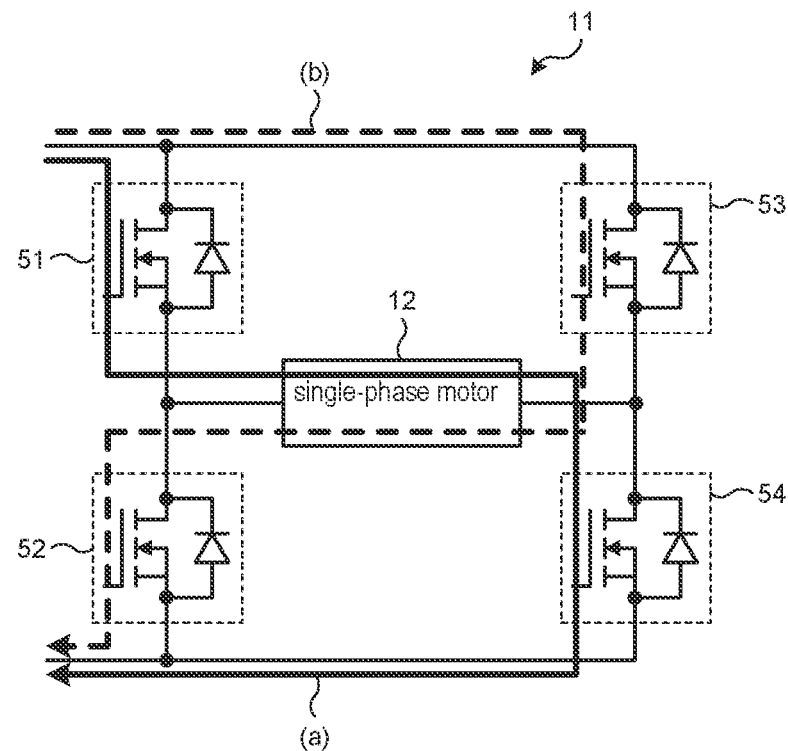
FIG. 13 is a first diagram illustrating a path of a motor current depending on the polarity of an inverter output voltage.
Figure 14:
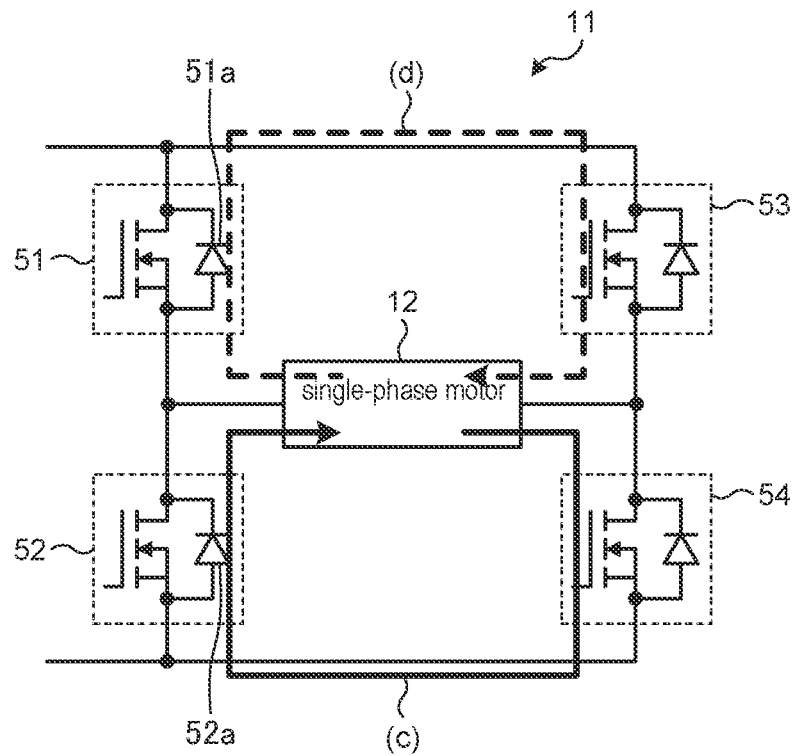
FIG. 14 is a second diagram illustrating the path of the motor current depending on the polarity of the inverter output voltage.
Figure 15:
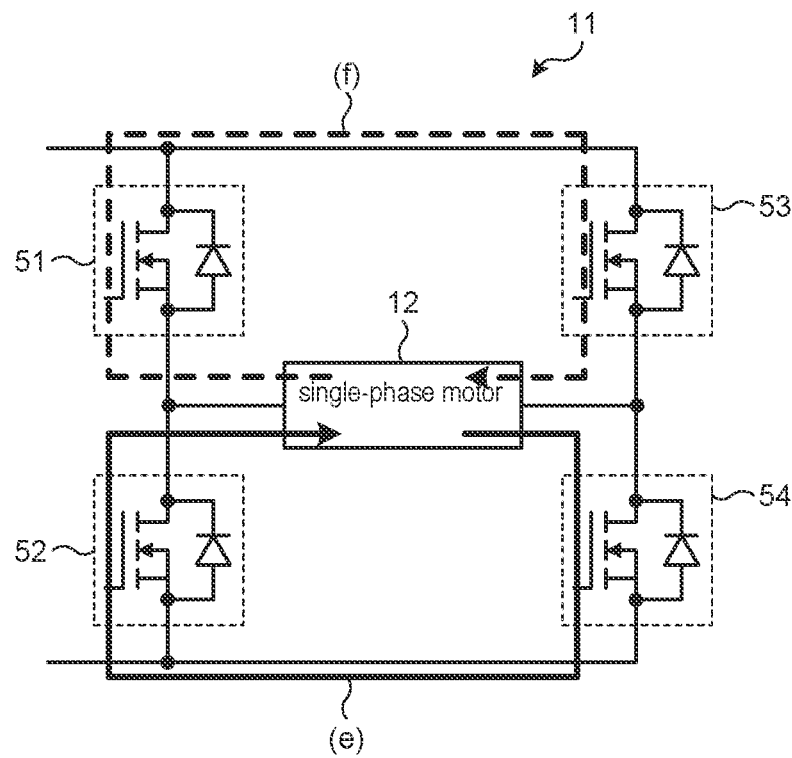
FIG. 15 is a third diagram illustrating the path of the motor current depending on the polarity of the inverter output voltage.
Figure 16:
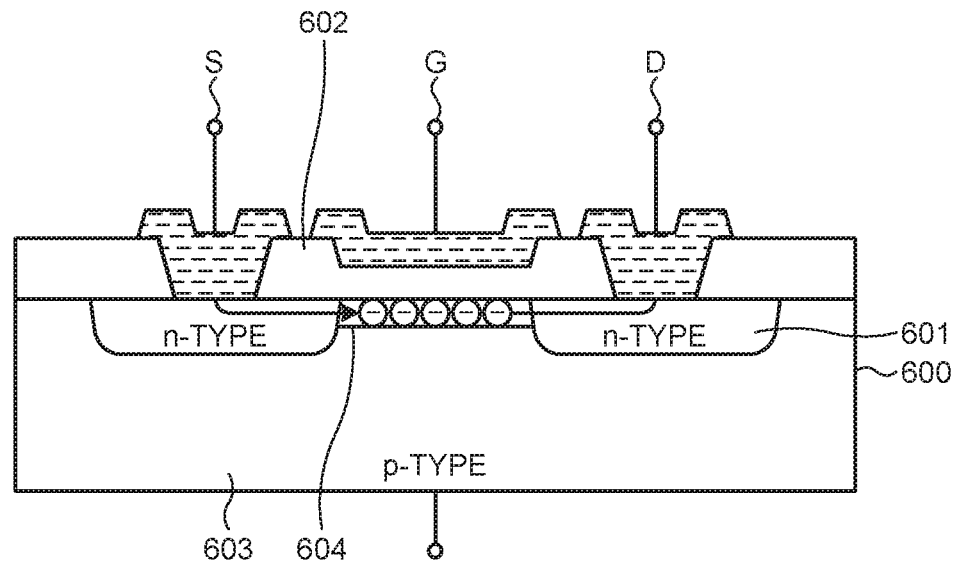
FIG. 16 is a schematic cross-sectional view illustrating a schematic structure of a metal-oxide-semiconductor field-effect transistor (MOSFET) that can be used as switching elements illustrated in FIG. 2.

Next, a loss reduction method in the present embodiment will be described with reference to FIGS. 13 to 16. FIG. 13 is a first diagram illustrating a path of a motor current depending on the polarity of the inverter output voltage. FIG. 14 is a second diagram illustrating the path of the motor current depending on the polarity of the inverter output voltage. FIG. 15 is a third diagram illustrating the path of the motor current depending on the polarity of the inverter output voltage. FIG. 16 is a schematic cross-sectional view illustrating a schematic structure of a MOSFET that can be used as the switching elements illustrated in FIG. 2. First, the schematic structure of the MOSFET will be described with reference to FIG. 16, and then the path of the motor current will be described with reference to FIGS. 13 to 15.

FIG. 16 illustrates an n-type MOSFET. In a case of the n-type MOSFET, a p-type semiconductor substrate 600 is used as illustrated in FIG. 16. A source electrode S, a drain electrode D, and a gate electrode G are formed on the semiconductor substrate 600. A high-concentration impurity is ion-implanted to form a region 601 of n-type at each of portions in contact with the source electrode S and the drain electrode D. In addition, the semiconductor substrate 600 has an oxide insulating film 602 formed thereon between the gate electrode G and a portion where the region 601 of n-type is not formed. That is, the oxide insulating film 602 is interposed between the gate electrode G and a region 603 of p-type in the semiconductor substrate 600.

When a positive voltage is applied to the gate electrode G, electrons are attracted to a boundary surface between the region 603 of p-type in the semiconductor substrate 600 and the oxide insulating film 602, such that the boundary surface is negatively charged. In a portion where the electrons are gathered, the electron density becomes higher than the hole density, such that the portion is changed into an n-type portion. The n-type portion serves as a path for a current and is called a channel 604. The channel 604 is an n-type channel in the example in FIG. 16. The MOSFET is controlled such that the MOSFET is turned on, thereby allowing more current to flow through the channel 604 than through a body diode formed in the region 603 of p-type.

When the polarity of the inverter output voltage is positive, as indicated by thick solid line (a) in FIG. 13, the current flows into the single-phase motor 12 through a channel of the switching element 51 which is an upper arm of a first phase, and flows out of the single-phase motor 12 and through a channel of the switching element 54 which is a lower arm of a second phase. When the polarity of the inverter output voltage is negative, as indicated by thick broken line (b) in FIG. 13, the current flows into the single-phase motor 12 through a channel of the switching element 53 which is an upper arm of the second phase, and flows out of the single-phase motor 12 and through a channel of the switching element 52 which is a lower arm of the first phase.

Next, a current path when the inverter output voltage is zero, that is, when a zero voltage is output from the single-phase inverter 11 will be described. When the inverter output voltage becomes zero after the positive inverter output voltage is generated, a current flows in a freewheeling mode in which a current flows between the single-phase inverter 11 and the single-phase motor 12 without current flowing from a power supply side, as indicated by thick solid line (c) in FIG. 14. More specifically, the direction of the current having flowed through the single-phase motor 12 immediately before that freewheeling mode is unchanged, such that the current flows out of the single-phase motor 12 and returns to the single-phase motor 12 through the channel of the switching element 54 which is the lower arm of the second phase and the body diode 52*a* of the switching element 52 which is the lower arm of the first phase. When the inverter output voltage becomes zero after the negative inverter output voltage is generated, the direction of the current having flowed immediately therebefore is opposite to the above direction of flow of current immediately before the inverter output voltage changes from the positive inverter output voltage to zero. As a result, as indicated by thick broken line (d) in FIG. 14, the direction of the freewheeling current is opposite to that indicated by thick solid line (c) in FIG. 14. More specifically, the current flowing out of the single-phase motor 12 returns to single-phase motor 12 through the body diode 51*a* of the switching element 51 which is the upper arm of the first phase and the channel of the switching element 53 which is the upper arm of the second phase.

As described above, in the freewheeling mode in which the current freewheelingly flows between the single-phase motor 12 and the single-phase inverter 11, the current flows through the body diode in either one of the first phase and the second phase. Generally, it is known that conduction loss is generally smaller when a current passes through a channel of a MOSFET than when a current passes through in a forward direction of a diode. Therefore, in the present embodiment, the MOSFET including a body diode which would allow a current to flow therethrough is controlled such that the MOSFET is turned on to thereby reduce a flow current flowing through that body diode in the freewheeling mode providing the freewheeling current flows.

The switching element 52 is controlled such that the switching element 52 is turned on at a timing of the flow of the freewheeling current indicated by thick solid line (c) in FIG. 14 in the freewheeling mode. Such control on the switching element 52 allows most of the freewheeling current to flow through the channel of the switching element 52 having a small resistance value, as indicated by thick solid line (e) in FIG. 15. Consequently, the conduction loss in the switching element 52 is reduced. In addition, the switching element 51 is controlled such that the switching element 51 is turned on at timing when the freewheeling current indicated by thick broken line (d) of FIG. 14 flows. Such control on the switching element 51 allows most of the freewheeling current to flow through the channel of the switching element 51 having a small resistance value, as indicated by thick broken line (f) in FIG. 15. Consequently, the conduction loss in the switching element 51 is reduced.

As described above, the MOSFET including a body diode is controlled such that the MOSFET is turned on at the timing when the freewheeling current flows through that body diode. As a result, the loss in the switching element can be reduced. The MOSFET, which can be controlled in the above manner, can be surface-mounted on a substrate such that heat can be dissipated on the substrate. Part or all of the switching elements are formed of wide band gap semiconductors, such that heat generation in the MOSFET is reduced only by the substrate. Note that if heat can be dissipated only by the substrate, a heat sink is not required, which contributes to reduction in size of an inverter and can lead to reduction in size of a product.

In addition to the above-described heat dissipation method, a further heat dissipation effect can be obtained by installing the substrate in the air passage. Here, the air passage is a space around a fan such as an electric blower generating an air flow, or a passage through which the wind generated by the electric blower flows. As a result of installation of the substrate in the air passage, heat in a semiconductor element on the substrate can be dissipated by the wind generated by the electric blower, so that heat generation in the semiconductor element can be significantly reduced.

Figure 17:
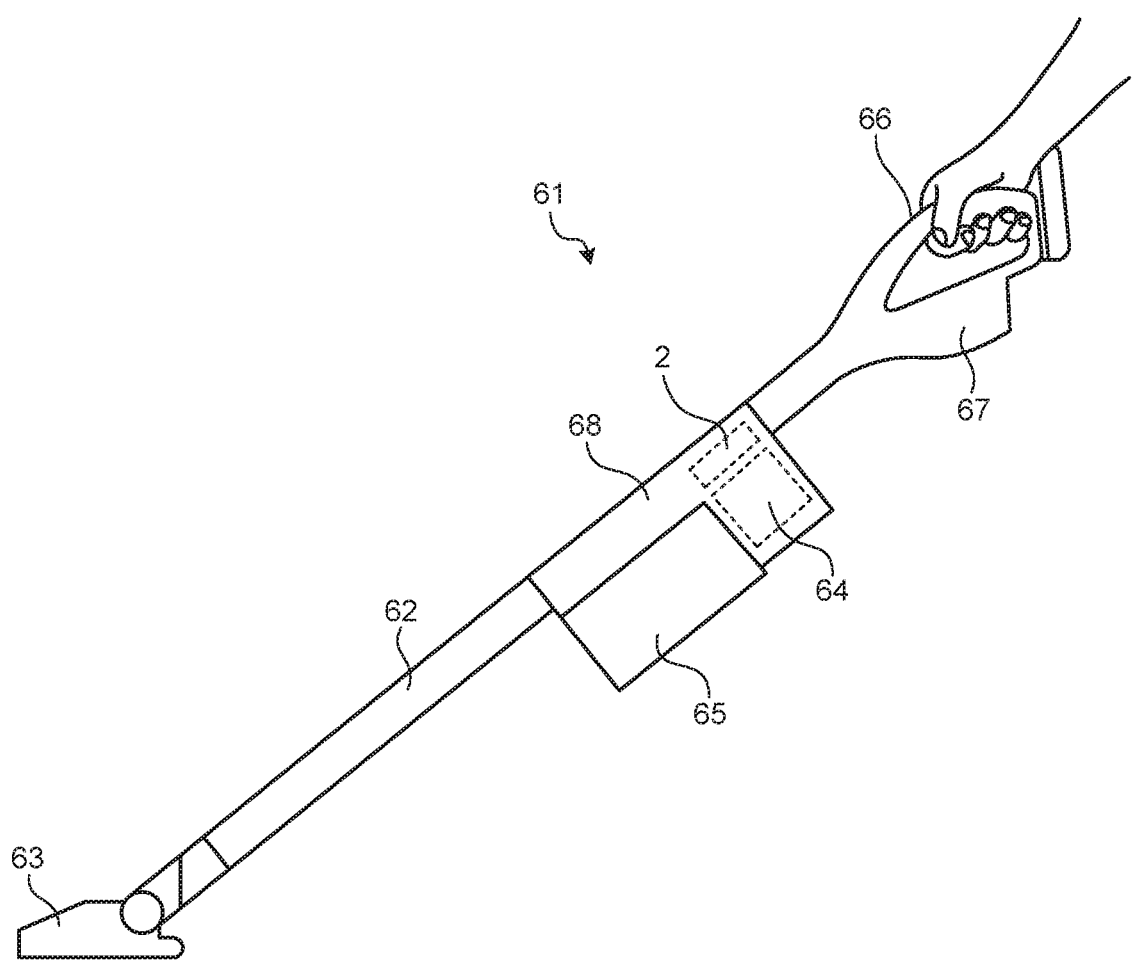
FIG. 17 is a configuration view of an electric vacuum cleaner including the motor drive device according to the embodiment of the present invention.

Next, an application example of the motor drive device according to the embodiment will be described. FIG. 17 is a configuration diagram of an electric vacuum cleaner including the motor drive device according to the embodiment of the present invention. An electric vacuum cleaner 61 includes a battery 67 which is a direct-current power supply, the motor drive device 2 illustrated in FIG. 1, an electric blower 64 driven by the single-phase motor 12 illustrated in FIG. 1, a dust collection chamber 65, a sensor 68, a suction port body 63, an extension pipe 62, and an operation portion 66. The battery 67 corresponds to the power supply 10 illustrated in FIG. 1.

A user who uses the electric vacuum cleaner 61 holds the operation portion 66 and operates the electric vacuum cleaner 61. The motor drive device 2 of the electric vacuum cleaner 61 drives the electric blower 64 by using the battery 67 as a power supply. By driving the electric blower 64, dust is sucked from the suction port body 63, and the sucked dust is collected in the dust collection chamber 65 via the extension pipe 62.

The electric vacuum cleaner 61 is a product whose number of motor rotations changes from 0 [rpm] to 100,000 [rpm]. The number of motor rotations may reach a value of 100,000 [rpm] or more. The control method according to the embodiment described above is suitable for driving such a product in which the single-phase motor 12 rotates at a high speed. As described above, the electric vacuum cleaner 61 is an application in which a load changes depending on a contact area between the suction port of the electric vacuum cleaner and the floor surface, and is also an application with a high acceleration rate. For this reason, the rotation speed of the motor mounted on the electric vacuum cleaner 61 may reach a limit value instantly. According to the motor drive device 2 of the present embodiment, since the brake control is performed in an application in which the rotation speed of the motor rapidly increases, the rotation speed of the motor can be kept within an operable range of the product, and thus, the operation quality of the electric vacuum cleaner 61 can be improved and the reliability of the electric vacuum cleaner 61 can be increased.

In addition, according to the motor drive device 2 of the present embodiment, the brake torque is generated by turning on the lower-arm switching elements when the brake control is performed. At that time, the boot capacitor 202 is instantly charged via the lower-arm switching element. It is therefore possible to shorten or eliminate time for charging the boot capacitor 202 in restarting the single-phase inverter 11 immediately after the single-phase inverter 11 stops. Accordingly, the restart time of the single-phase inverter 11 can be shortened.

Figure 18:
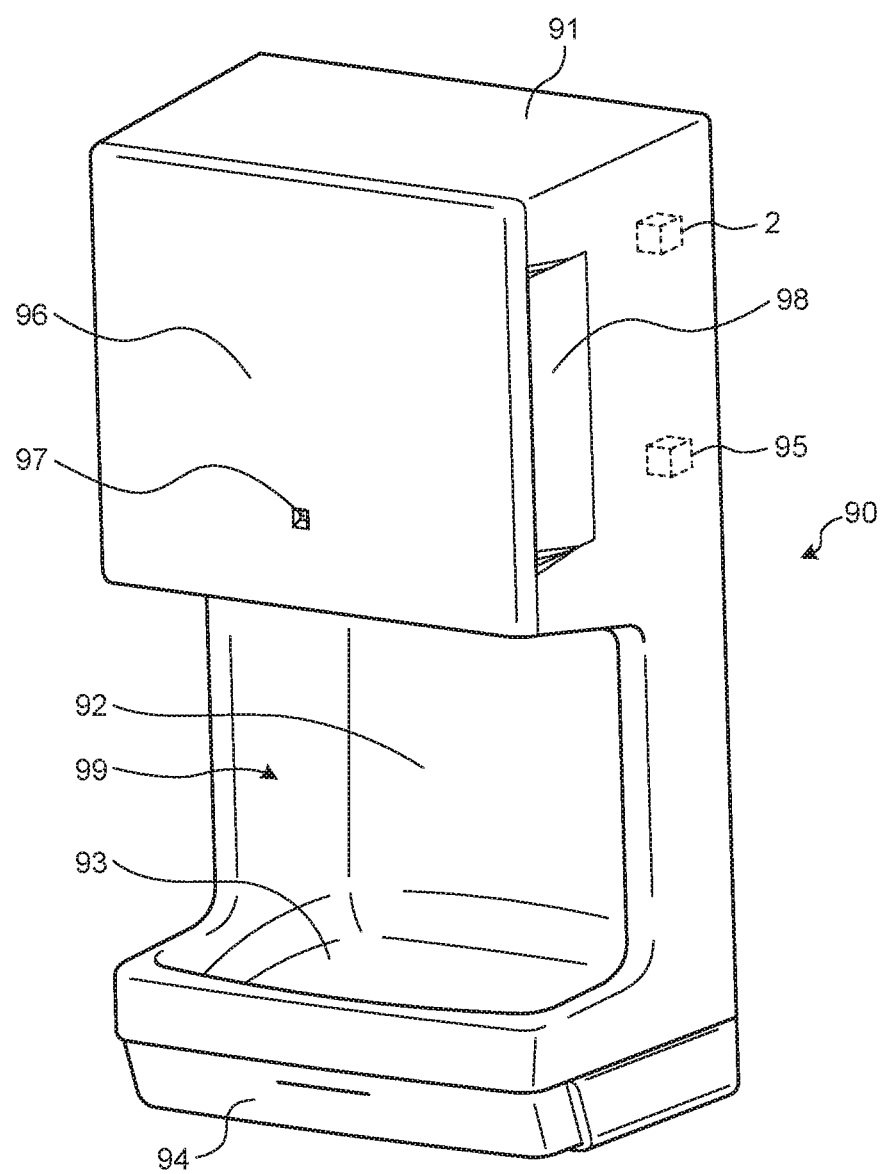
FIG. 18 is a configuration view of a hand dryer including the motor drive device according to the embodiment of the present invention.

FIG. 18 is a configuration view of a hand dryer including the motor drive device according to the embodiment of the present invention. A hand dryer 90 includes the motor drive device 2, a casing 91, a hand detection sensor 92, a water receiving portion 93, a drain container 94, a cover 96, a sensor 97, an air inlet port 98, and an electric blower 95. The sensor 97 is either a gyro sensor or a motion sensor. When the hand is inserted into a hand insertion portion 99 located above the water receiving portion 93 of the hand dryer 90, the electric blower 95 blows off water by air blow, and the blown-off water is collected in the water receiving portion 93 and then stored in the drain container 94.

The hand dryer 90 is a product whose number of motor rotations changes from 0 [rpm] to 100,000 [rpm] as in the electric vacuum cleaner 61 illustrated in FIG. 17. Therefore, the control method according to the embodiment described above is suitable for the hand dryer 90 as well, and can provide an effect similar to that of the electric vacuum cleaner 61.

Figure 19:
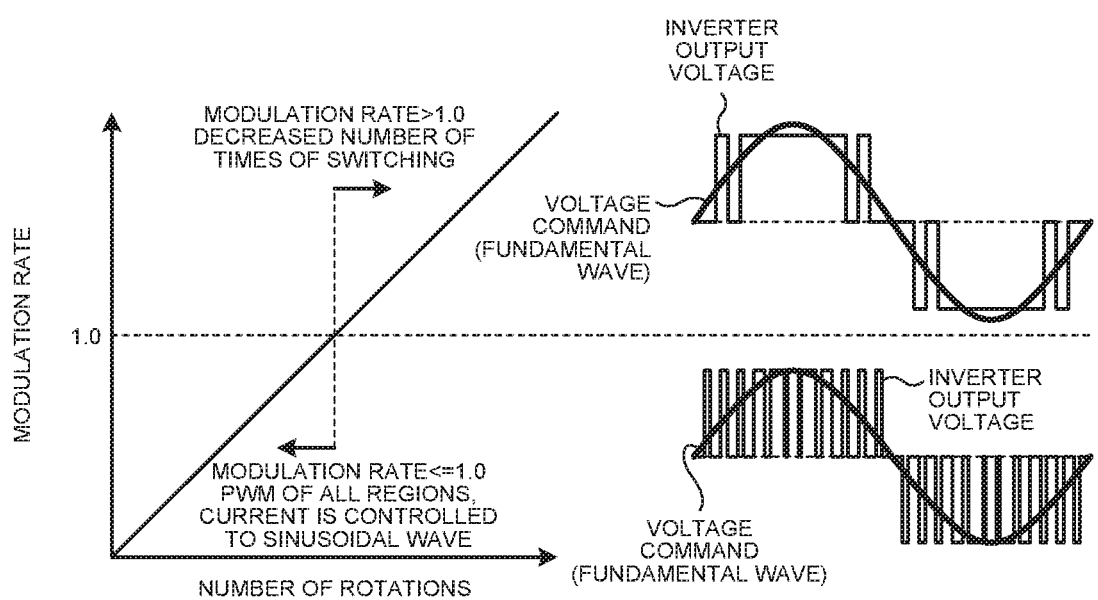
FIG. 19 is a diagram for explaining modulation control performed by the motor drive device according to the embodiment of the present invention.

FIG. 19 is a diagram for explaining modulation control performed by the motor drive device according to the embodiment of the present invention. The left side of FIG. 18 illustrates a relationship between the number of rotations and a modulation rate. The right side of FIG. 18 illustrates a waveform of an inverter output voltage when the modulation rate is 1.0 or less, and a waveform of the inverter output voltage when the modulation rate exceeds 1.0. Generally, a load torque of a rotating body increases as the number of rotations increases. For this reason, it is necessary to increase a motor output torque as the number of rotations increases. In addition, generally, the motor output torque increases in proportion to a motor current, and an increase in the motor current requires an increase in the inverter output voltage. Accordingly, the number of rotations can be increased by increasing the modulation rate and increasing the inverter output voltage.

Next, control on the number of rotations in the present embodiment will be described. The following description is based on the assumption that an electric blower is a load, and an operating range of the electric blower is divided as follows.

(A) Low-speed rotation region (region of a low number of rotations): 0 [rpm] to 100,000 [rpm]

(B) High-speed rotation region (region of a high number of rotations): 100,000 [rpm] or more A region sandwiched between (A) and (B) above is a gray area, and may be included in the low-speed rotation region or in the high-speed rotation region depending on applications.

First, the control in the low-speed rotation region will be described. In the low-speed rotation region, PWM control is performed with a modulation rate of 1.0 or less. Setting the modulation rate to 1.0 or less allows the motor current to be controlled such that the motor current provides a sinusoidal wave, and higher efficiency of the motor can be achieved. When the motor is operated using the carrier frequency common to the low-speed rotation region and the high-speed rotation region, the carrier frequency conforms to the high-speed rotation region, and therefore PWM pulses in the low-speed rotation region tends to increase more than necessary. For this reason, a method of lowering the carrier frequency in the low-speed rotation region to reduce switching loss may be used. Alternatively, control may be performed in such a way that the carrier frequency is changed in synchronization with the number of rotations, thereby preventing the number of pulses from changing in correspondence to the number of rotations.

Next, the control in the high-speed rotation region will be described. In the high-speed rotation region, the modulation rate is set to a value larger than 1.0. Setting the modulation rate to larger than 1.0 allows the inverter output voltage to increase and the number of times of switching performed by the switching elements in the inverter to decrease, thereby making it possible to reduce an increase in switching loss. The modulation rate exceeding 1.0 increases the motor output voltage, but decreases the number of times of switching, which results in concern about current distortion. However, the current distortion in the high-speed rotation region is smaller than that in the low-speed rotation region, thus lessening an effect on waveform distortion because a reactance component of the motor increases and di/dt which is a change component of the motor current decreases during high-speed rotation. Accordingly, in the high-speed rotation region, the modulation rate is set to a value larger than 1.0, and control is performed so that the number of switching pulses is reduced. By this control, an increase in switching loss can be reduced and higher efficiency can be achieved.

As described above, the boundary between the low-speed rotation region and the high-speed rotation region is ambiguous. Therefore, a first rotation speed that determines the boundary between the low-speed rotation region and the high-speed rotation region is set in the control unit 25. The control unit 25 performs control so that the modulation rate is set to 1.0 or less when the rotation speed of the motor or the load is equal to or lower than the first rotation speed, and the modulation rate is set to be exceeding 1 when the rotation speed of the motor or the load exceeds the first rotation speed.

As described above, in the present embodiment, the example configuration has been described in which the motor drive device 2 is applied to the electric vacuum cleaner 61 and the hand dryer 90, but the motor drive device 2 can be applied to an electric device on which a motor is mounted. Examples of the electric device on which a motor is mounted include an incinerator, a crusher, a dryer, a dust collector, a printing machine, a cleaning machine, a confectionery machine, a tea making machine, a woodworking machine, a plastic extruder, a cardboard machine, a packaging machine, a hot air generator, an office automation appliance, and an electric blower. The electric blower is a blowing means for object transportation, dust suction, or general blowing and exhausting.

The configurations described in the embodiment above are merely examples of the content of the present invention and can be combined with other known technology and part thereof can be omitted or modified without departing from the gist of the present invention.

The invention claimed is:
1. A motor drive device comprising
an inverter including a first arm and a second arm, the first arm being defined by a first upper-arm switching element and a first lower-arm switching element connected in series with the first upper-arm switching element, the second arm being defined by a second upper-arm switching element and a second lower-arm switching element connected in series with the second upper-arm switching element, the second arm being connected in parallel with the first arm, the inverter converting a direct-current voltage output from a direct-current power supply into an alternating-current voltage, and outputting the alternating-current voltage as a motor applied voltage to be applied to a single-phase motor, wherein the motor applied voltage has a high level, low level, or zero level potential, a set of the first upper-arm switching element and the first lower-arm switching element and a set of the second upper-arm switching element and the second lower-arm switching element generate the motor applied voltage by being alternately placed in off states for each half cycle of a power supply, and in brake control to reduce a rotation speed of the single-phase motor, the first upper-arm switching element and the second upper-arm switching element are turned off, and the first lower-arm switching element and the second lower-arm switching element are turned on while the rotation speed of the single-phase motor is reduced in such a manner as to widen a section in which a potential of the motor applied voltage is zero level.

2. The motor drive device according to claim 1, wherein when the rotation speed of the motor is to be reduced, the motor applied voltage is decreased.

3. The motor drive device according to claim 1, wherein the inverter includes a drive circuit and a bootstrap circuit, the drive circuit outputting a drive signal driving the first upper-arm switching element, the bootstrap circuit including a boot capacitor applying a power supply voltage of the drive circuit to the drive circuit.

4. The motor drive device according to claim 1, further comprising a voltage sensor detecting the direct-current voltage, wherein an operation of the inverter is stopped when it is determined using the direct-current voltage that an induced voltage generated in the motor is decreased to be lower than the direct-current voltage.

5. The motor drive device according to claim 1, further comprising a position sensor detecting a rotational position of a rotor of the motor, and outputting rotational position information indicating the detected rotational position, wherein the rotation speed of the motor is reduced when it is determined using the rotational position information that the rotation speed of the motor exceeds a rotation speed threshold.

6. The motor drive device according to claim 3, wherein at least one of the first upper-arm switching element, the first lower-arm switching element, the second upper-arm switching element, and the second lower-arm switching element is formed of a wide band gap semiconductor.

7. The motor drive device according to claim 6, wherein the wide band gap semiconductor is silicon carbide, gallium nitride, or diamond.

8. An electric blower comprising the motor drive device according to claim 1.

9. An electric vacuum cleaner comprising the electric blower according to claim 8.

10. A hand dryer comprising the electric blower according to claim 8.

* * * * *